United States Patent
Martinez et al.

(10) Patent No.: US 8,010,219 B2
(45) Date of Patent: Aug. 30, 2011

(54) COMPUTER AUTOMATED TEST AND PROCESSING SYSTEM OF RFID TAGS

(75) Inventors: Genaro Martinez, Placitas, NM (US); Jay Wells, Albuquerque, NM (US); Nelson Lewis, Albuquerque, NM (US); Gabriel Martinez, Albuquerque, NM (US)

(73) Assignee: TC License, Ltd., Hummelstown, PA (US)

( * ) Notice: Subject to any disclaimer, the term of this patent is extended or adjusted under 35 U.S.C. 154(b) by 1314 days.

(21) Appl. No.: 11/418,242

(22) Filed: May 5, 2006

(65) Prior Publication Data

US 2008/0000074 A1    Jan. 3, 2008

(51) Int. Cl.
*G06F 19/00* (2011.01)
*G06F 7/00* (2006.01)
*G21C 17/00* (2006.01)
*G01R 31/28* (2006.01)

(52) U.S. Cl. ............ 700/112; 700/213; 271/65; 29/593; 340/572.1; 340/572.8; 340/10.1; 209/630; 414/788.3; 398/108; 365/192

(58) Field of Classification Search .................. 700/112, 700/213; 271/65; 29/593; 209/630; 414/788.3; 340/572.1, 572.8, 12.51, 10.1; 398/108; 365/192; 702/182
See application file for complete search history.

(56) References Cited

U.S. PATENT DOCUMENTS

| | | | |
|---|---|---|---|
| 4,630,358 A | 12/1986 | Taylor et al. | |
| 5,894,711 A * | 4/1999 | Davidson et al. | 53/432 |
| 5,983,363 A | 11/1999 | Tuttle et al. | |
| 6,104,291 A * | 8/2000 | Beauvillier et al. | 340/572.1 |
| 6,112,940 A | 9/2000 | Canella | |
| 6,135,291 A * | 10/2000 | Canella | 209/573 |
| 6,138,053 A * | 10/2000 | Demarest et al. | 700/117 |
| 6,236,223 B1 * | 5/2001 | Brady et al. | 324/765 |
| 6,346,881 B1 | 2/2002 | Davidson | |
| 6,487,681 B1 | 11/2002 | Tuttle et al. | |
| 6,535,786 B1 * | 3/2003 | Duemler | 700/169 |
| 6,648,586 B1 * | 11/2003 | Catoe et al. | 414/788.4 |
| 6,784,789 B2 | 8/2004 | Eroglu et al. | |
| 6,848,616 B2 | 2/2005 | Tsirline et al. | |
| 6,951,596 B2 | 10/2005 | Green et al. | |
| 7,164,353 B2 * | 1/2007 | Puleston et al. | 340/514 |
| 2002/0116090 A1 | 8/2002 | Fischer | |
| 2004/0113349 A1 * | 6/2004 | Hudson et al. | 271/65 |
| 2005/0137940 A1 * | 6/2005 | Lindsay | 705/26 |

(Continued)

OTHER PUBLICATIONS

New High-Speed RFID Tag Machine,"RFID Journal, Sep. 19, 2003, http://www.rfidjournal.com/article/articleview/586/1/1/),"New High-Speed RFID Tag Machine, 2003, pp. 1-2.*

(Continued)

*Primary Examiner* — Albert Decady
*Assistant Examiner* — Olvin Lopez Alvarez
(74) *Attorney, Agent, or Firm* — Caesar, Rivise, Bernstein, Cohen & Pokotilow, Ltd.

(57) ABSTRACT

An automated system for the processing of radio frequency identification (RFID) tags. The automated system allows for the simultaneous processing of multiple individual tags through the use of multiple processing stations. A table is provided that is capable of moving the individual tags from one processing station to the next. Tables are also provided for receiving unprocessed tags for input into the system and processed tags for packaging. Individual tags are moved between the tables by a transfer mechanism.

23 Claims, 10 Drawing Sheets

U.S. PATENT DOCUMENTS

| | | |
|---|---|---|
| 2005/0150102 A1 | 7/2005 | Bosco et al. |
| 2006/0081333 A1* | 4/2006 | Hohberger et al. ............ 156/344 |
| 2007/0150219 A1* | 6/2007 | Cawker et al. .................. 702/82 |
| 2007/0166954 A1* | 7/2007 | Yamazaki et al. ............ 438/452 |
| 2008/0095676 A1* | 4/2008 | Andretta ....................... 422/188 |

OTHER PUBLICATIONS

Wong, "integartion of Auto-ID tagging System with holonic Manufacturing System", 2001, pp. 1-52.*

International Search Report, PCT/US07/68378, dated Feb. 8, 2008.

* cited by examiner

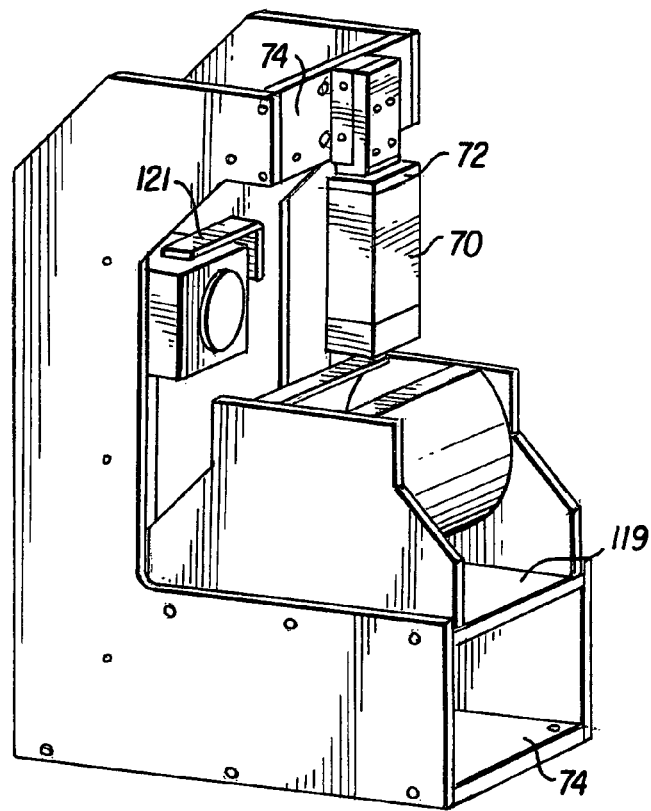
FIG. 9
FIG. 10A
FIG. 10B
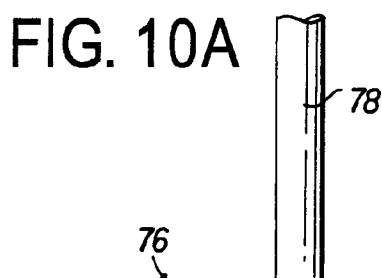
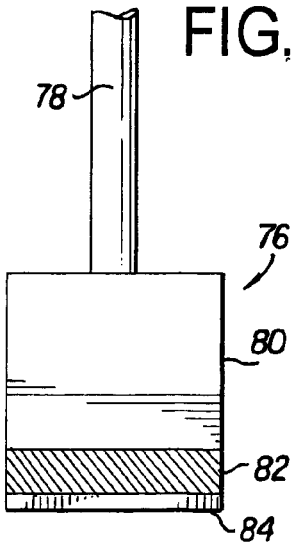
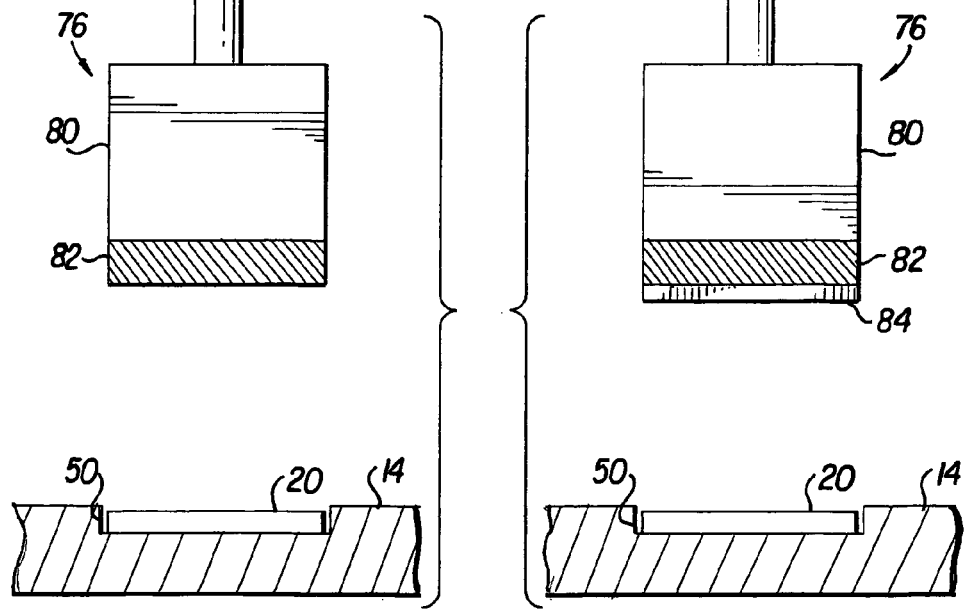

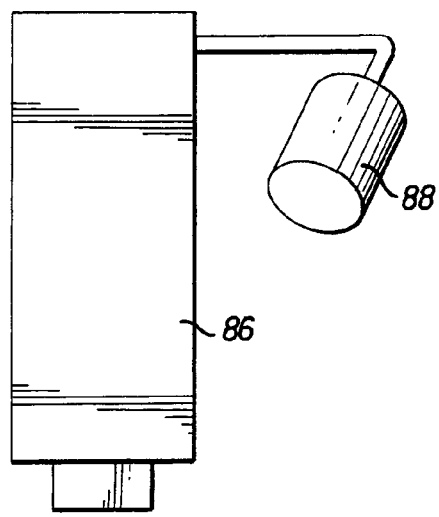
FIG. 11
FIG. 13
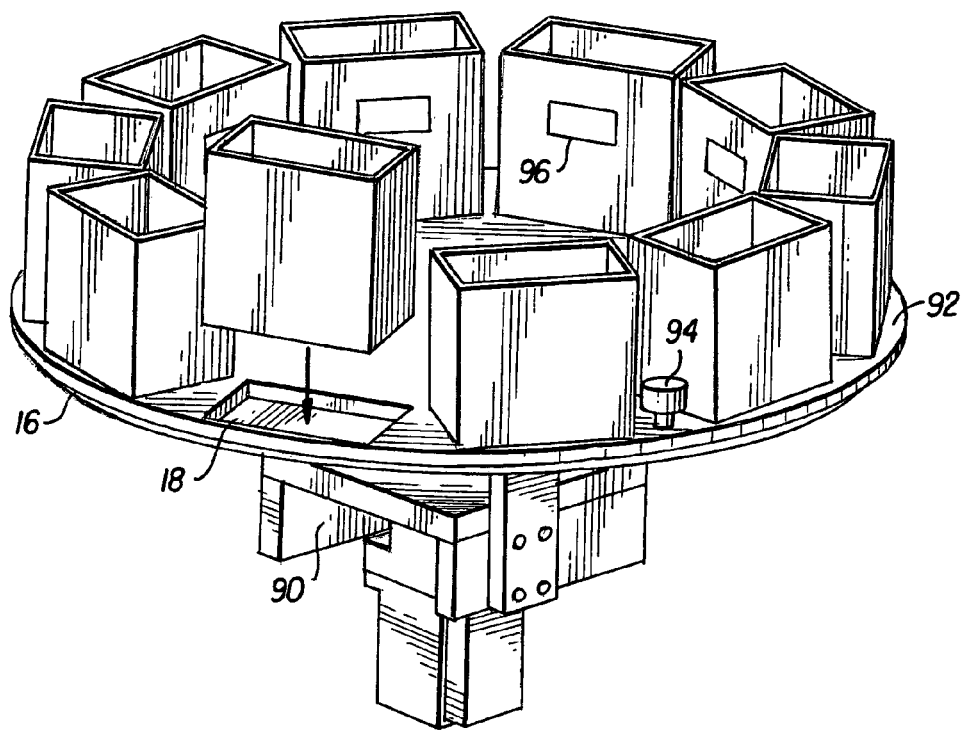

COMPUTER AUTOMATED TEST AND PROCESSING SYSTEM OF RFID TAGS

FIELD OF THE INVENTION

The present invention relates to a system and method for manufacturing radio frequency identification (RFID) tags. The present invention also relates to a system and method for high throughput quality control testing of RFID tags.

BACKGROUND OF THE INVENTION

Radio frequency identification (RFID) tags have a wide variety of applications, especially in the transportation field. RFID tags have a variety of uses, including toll collection, security access, parking, and vehicle tracking. First generation RFID tags, such as described in U.S. patent application Ser. No. 10/246,456, were typically encased in a hard plastic, making them bulky and expensive to manufacture. Label-based RFID tags, such as described in U.S. patent application Ser. No. 11/349,093, were developed to overcome the physical limitations of the hard cased tags. Label-based tags are thin, flexible and may be assembled in sheets, making them easier and less expensive to manufacture. However, for proper testing of label-based tags, the tags need to be separated for individual testing of their radio frequency (RF) response using large anechoic chambers. Testing of label-based tags in this manner requires significant time and precludes high-volume production.

Various systems have been derived for testing or producing tags, such as those shown in U.S. Pat. No. 6,487,681 to Tuttle et al., U.S. Pat. No. 6,951,596 to Green et al. and U.S. Pat. No. 6,104,291 to Beauvillier et al. However, there is a need in the art for a high-throughput method for the testing and production of individual RFID tags. It is further a need in the art to have a testing and production system that is as automated as possible, to reduce production time and manufacturing costs, yet is highly reliable and efficient.

SUMMARY OF THE INVENTION

It is an object of the present invention to provide a high-volume system and method for manufacturing RFID tags. The system and method of the present invention allow for automated testing, programming, labeling, sorting and packaging of RFID tags with minimal operator intervention. The tags are tested to assure that they meet specifications for use in free space or when mounted (typically on a windshield) on a vehicle. Tags that are non-operational or substandard are eliminated from use. The tested tags are automatically packed in groups for shipment. A computer based audit system provides data on the tags that have been packed.

The present invention is the next generation design for the production of label-based RFID tags. The system of the invention incorporates advanced RF resonant cavity technology to greatly reduce the footprint and space requirements of the testing equipment. Previous apparatuses for testing RFID tags have been constrained by the large size of the anechoic RF chambers used for RF testing of tags. The use of RF resonant cavities allows for a more compact RFID tag testing apparatus.

The present invention allows for high-volume processing of tags through its multiple station design. The tags in the system undergo multiple tests as they move sequentially from one station to the next, allowing for parallel testing and processing of multiple tags. As many tags are able to be processed at once, the cycle time of production is greatly reduced.

The present invention is designed for efficient operator use by placing the load and unload ports and the control console so as to minimize the travel required by the operator. Once a tag enters the system, no operator intervention is required unless the operator is alerted to a problem in the system. Because of the design of the present invention, the operator may easily and efficiently input more unprocessed tags into the system, while removing processed and packaged tags and monitoring the system for any incidents.

BRIEF DESCRIPTION OF THE DRAWINGS

FIG. 9 is a detailed view of an RF testing station used in the RFID tag processing system of FIG. 1.

FIGS. 10A-C are detailed views of the label applicator used in the RFID tag processing system of FIG. 1.

FIG. 11 is a detailed view of the machine vision apparatus used in the RFID tag processing system of FIG. 1.

FIG. 13 is a detailed view of the output table used in the RFID tag processing system of FIG. 1.

DETAILED DESCRIPTION OF THE INVENTION

Figure 1A:
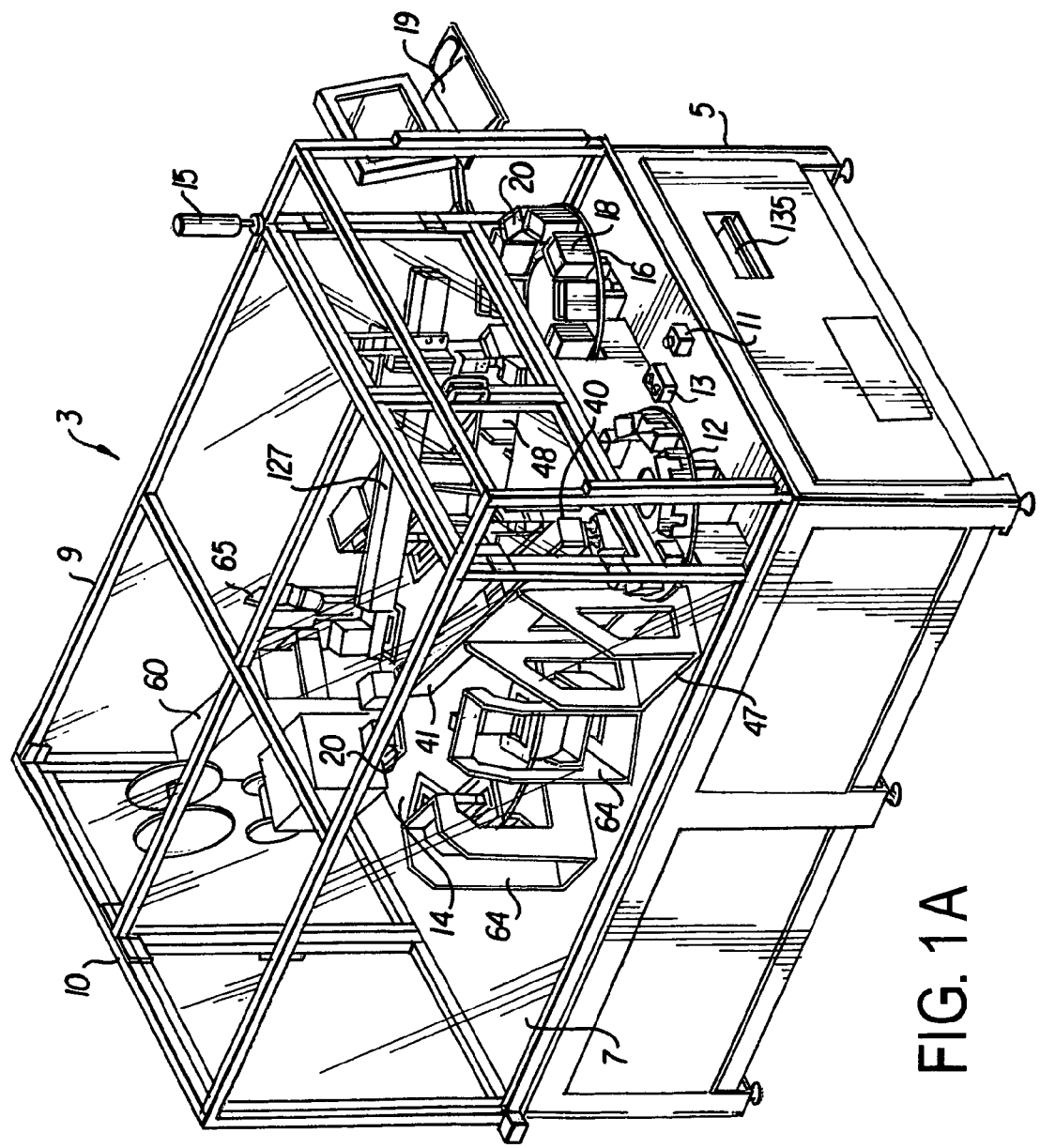
FIGS. 1A and B are overview diagrams of an embodiment of the RFID tag processing system of the present invention.

FIGS. 1A and B are overall diagrams of the tag production apparatus 3 in accordance with the preferred embodiment of the present invention. The apparatus 3 includes a tag processing system 10, mounted to a bench 5 and surrounded by an enclosure 9. The tag processing system 10 essentially has an input table 12, main table 14, output table 16, and transfer devices 41, 127.

Figure 4:
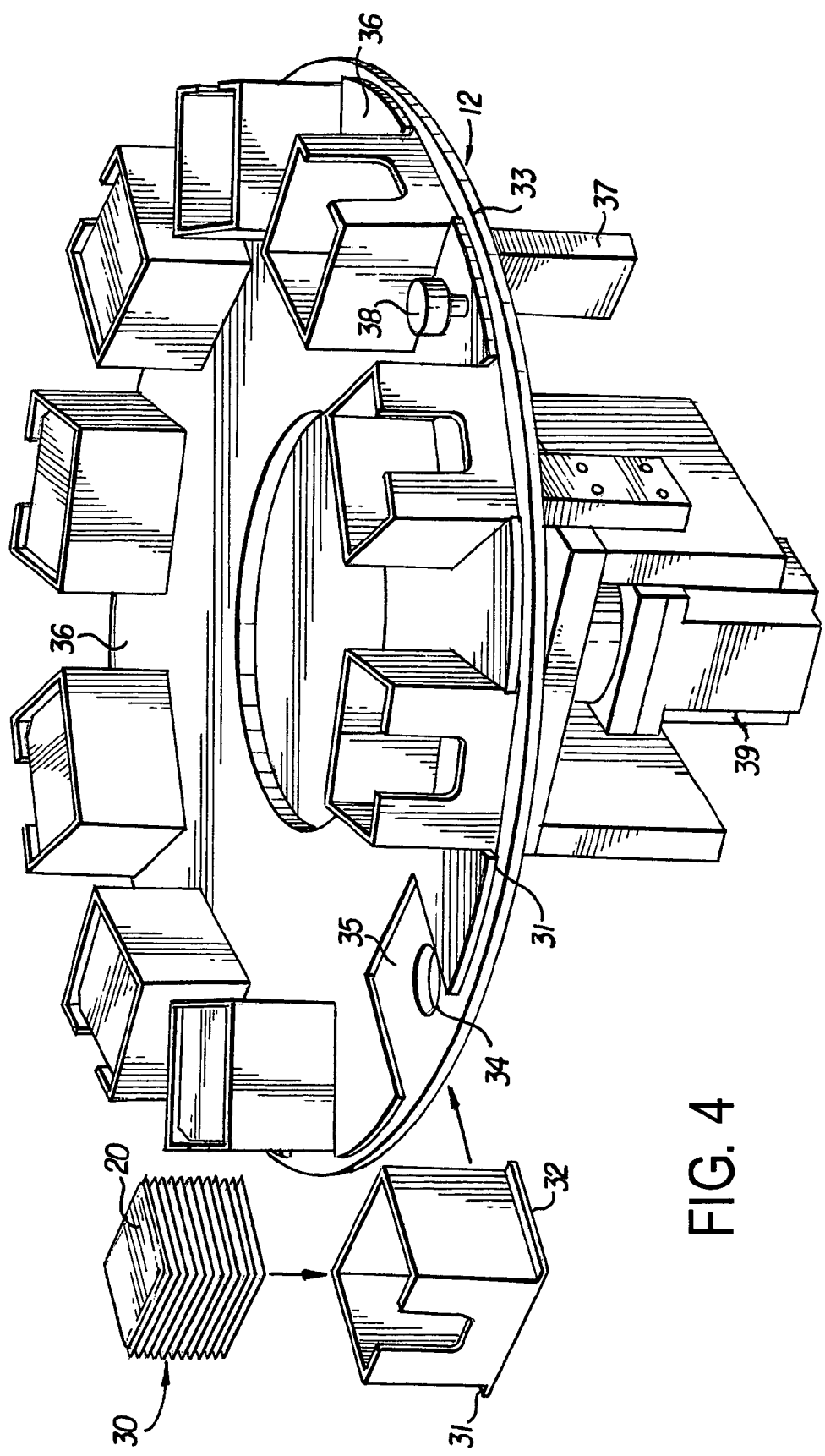
FIG. 4 is a detailed perspective view of an embodiment of one of the input tables used the RFID tag processing system of FIG. 1.

In general operation of the system 10, label-based tags 20 are loaded on the input table 12 (FIG. 4). Transfer device 40 (FIG. 5) is used to transfer the tags 20 to the main table 14 (FIG. 6), where they are tested, programmed and labeled at various automated work stations 52-66 that are positioned about the table 14. After the tags are processed, they are transferred by another transfer device 41 to the output table 16, where they are packaged into labeled boxes 18, for shipping. The operation of the entire system 10 is monitored and controlled by a master controller 1012, located in the base 5 of the system 10, which the operator can communicate with through an interface terminal 19.

Figure 2:
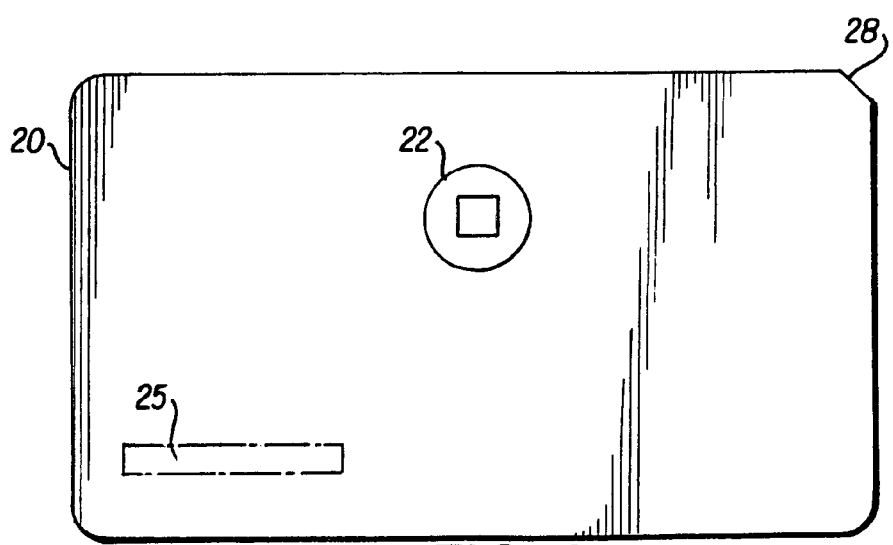
FIG. 2 is diagram of a typical RFID tag as produced by the system of the present invention.

The system and method of the present invention are designed for the high throughput production of label-based RFID tags. Examples of label-based tags include the eGo and SeGo tags sold by Transcore, Ltd. and as described in U.S. patent application Ser. No. 11/349,093. A non-limiting example of a label-based tag 20 that may be produced by the present invention is shown in FIG. 2. The RFID tag 20 shown in FIG. 2 is an example of a tag that has been tested and labeled according to the present invention. The tag has an application specific integrated circuit (ASIC) 22 (which, may include, for instance, a processor and memory), and an optional barcode 25 which may be added when the tag 20 is labeled. Optional customer graphics and printed information may also be added when the tag 20 is labeled. The tag 20 preferably has one chamfered corner 28 to allow for orientation of the tag 20.

Figure 3:
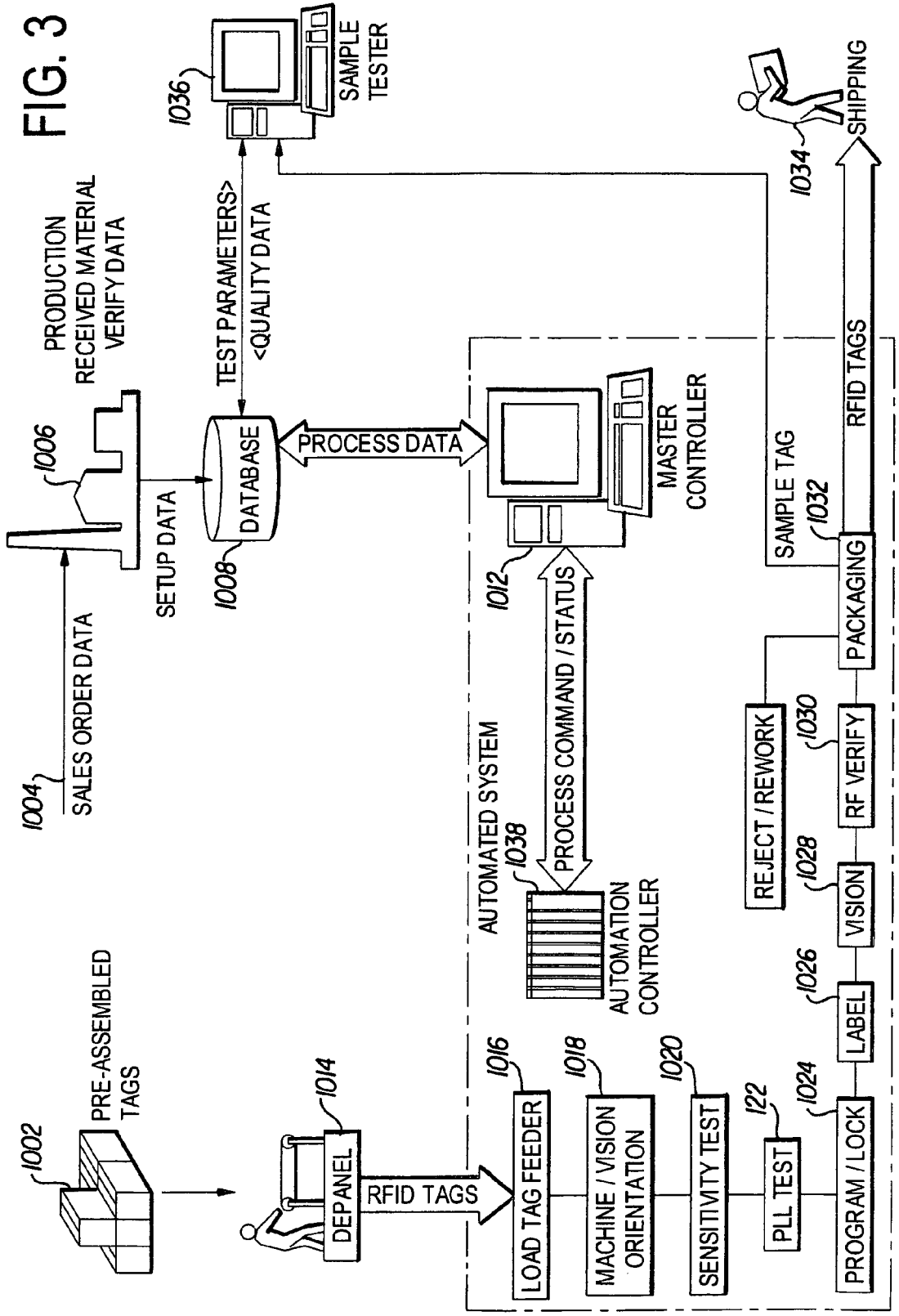
FIG. 3 is a system diagram showing the processing steps for producing RFID tags.

FIG. 3 is a system diagram giving an overview of the production of label-based RFID tags using the system 10 of the present invention. After an order for tags is received, pre-assembled panels of blank label-based RFID tags 1002 are obtained for further processing. The tags 20 in the panels have been pre-assembled with an ASIC 22 and have a pre-cut chamfer so that they each have a chamfered corner 28 upon removal from the panel. The tags 20 may be pre-assembled in panels of 60 tags arranged in a 5 by 12 array, although different panel configurations can be used.

A production database 1008 is provided that stores information to be written to the tags 20 and specifications for the testing and labeling of the tags 20. That information is obtained by the order processing computer 1006 from sales orders 1004 and stored to the production database 1008. The production database 1008 is a centrally located database in the production facility that communicates with the work stations 52-66 and with the master controller 1012 of all of the automated tag processing systems 10 in the production facility. After customer specifications are written to the production database 1008, it becomes the central information center for all data regarding production and testing of tags 20.

The production facility also has one or more sample tester computers 1036 for testing finished tag 20 samples taken after production. Those finished tag samples undergo individual testing using established protocols and equipment such as anechoic chambers. The sample tester receives the test parameters from the production database 1008 and use these parameters to establish general quality control tests. After each sample is tested, the sample tester computer 1036 provides test result data to the production database 1008, allowing for real time quality control monitoring.

The production database 1008 provides customer specifications and quality control data to the master controller 1012. As the tags 20 being processed undergo the various tests of the system 10, the master controller 1012 records the results of each individual tag 20 in the production database 1008. Based on information from the database 1008, the master controller 1012 controls how the tags are programmed, tested, and labeled at the various work stations 52-66. The master controller 1012 also controls whether a tag should be removed from the system as failures or as a sample. The master controller 1012 controls the overall processing operation, such as rotation of the tables, operation of the transfer mechanisms, etc. The master controller 1012 communicates these instructions through the automation controller 1038, which communicates directly with the various components of the system regarding the action required for the specific tag 20 being processed.

The preferred embodiments of the automated system and method for producing RFID tags will now be described. Steps in the automated process will be referred to by the reference numbers shown in FIG. 3. Other components of the system of the invention and other steps of the method of the invention are also contemplated. For instance, the order of the components of the system of the invention may be changed, and hence the steps of the method may also be changed, without departing from the spirit or scope of the invention as set forth herein.

The first step 1016 of the process is to separate the panels of tags into individual tags, preferably manually, and load the tags 20 onto the input table 12, which is shown in FIG. 4. The input table 12 generally includes a number of bins 32, for loading the tags. The preassembled RFID tags 20 are loaded into the bins 32 on the input table 12. The tags 20 are preferably stacked 30 so that each tag is turned 180 degrees from the tag just below it in the stack. This allows for more even stacking and allows for more tags to be stacked per bin. In addition, the staggered stacking prevents the tags from sticking to one another, so that a single tag is removed when a tag is to be retrieved from the bin 32. Staggering the tags also causes the surfaces of the tags to remain horizontally level, allowing them to be easily picked up by the transfer device 40. Alternated stacking is especially preferred when the tags have a non-uniform thickness, such as when the ASIC 22 protrudes from one or both sides of the tag.

The bins 32 have two elongated projections 31 extending along opposite sides of its base. The projections 31 mate with corresponding slots 34 in the top surface 36 of the input table 12. Accordingly, the bins 32 can be quickly removed and replaced for filling with tags 20, but are also firmly secured to the table surface 36. An opening 35 is positioned beneath each of the bins 32. This opening 35 corresponds to an opening in the bottom of each bin (not visible), which allows a sensor 37, to detect whether the bin 32 contains any tags 20. Preferably, the sensor 37 detecting whether or not the bin is empty is placed below the bin of tags being transferred to the main table 14. It is also contemplated that one or more sensors in other locations may be employed. The bins 32 are specifically sized to the size of tags 20 being processed.

The top surface 36 of the input table 12 is interchangeable, allowing for differently size bins 32 to accommodate differently sized tags. One or more thumbscrews 38 affix the top surface 36 to the base 33, making it possible to change the top surface 36 without the use of tools. Preferably, the input table 12 can accommodate 10 bins 32, with each bin capable of holding about 60 tags. Alternatively, bins of different sizes can all have a standard size base that is received by the table 12, so that the top surface 36 need not be interchanged to accommodate various sizes of tags 20.

The input table 12 is preferably circular in shape so as to allow for the easy rotation of the bins 32 from one position to the next. A drive 39, rotates the input table 12 to various positions that allow the tags 20 to be accessed by the system 10. The drive 39, is preferably a motor which is controlled by the automation controller 1038. The input table 12 is rotated so that each bin 32 of tags 20 to be processed is successively moved into the proper position to be loaded and transported to the main table 14. When the bin 32 being drawn from becomes empty, this is detected by the sensor 37 which signals to the automation controller 1038 to rotate the input table 12, bringing the next bin 32 into position and eventually bringing the empty bin 32 back around to a location where the operator can refill it.

It is also contemplated that the input table 12 may be a table capable of containing boxes filled with individual tags. In this alternate embodiment, the design of the input table 12 is very similar to that of the output table 16, which is shown in FIG. 13. With this embodiment of the invention, boxes may be received containing stacks of individual tags that are placed directly onto the input table 12, eliminating the need to separate the tags from panels and stack them into bins for processing.

Figure 5A:
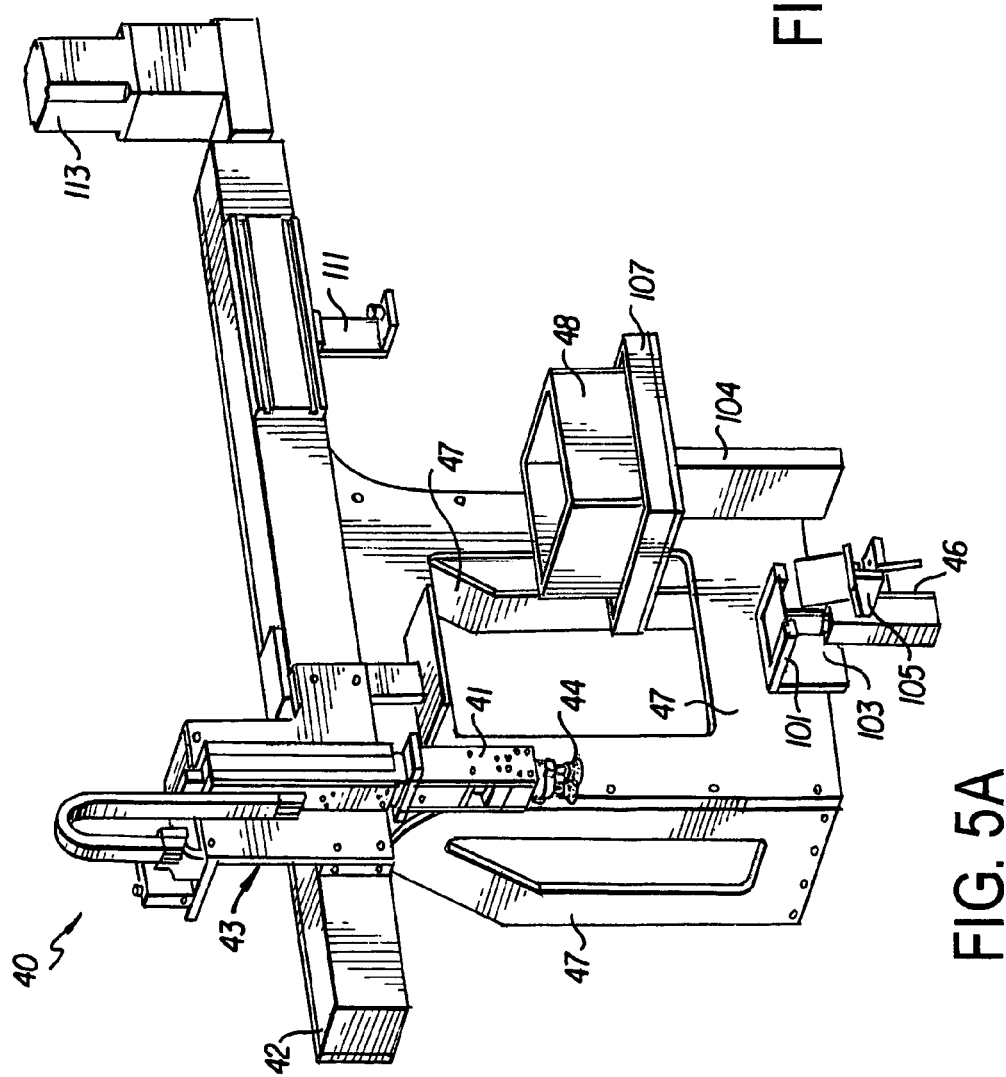
FIG. 5A is a detailed perspective view of the pick and place transfer mechanism used in the RFID tag processing system of FIG. 1.

Turning to FIG. 5A, a transfer device 40 is used to individually transfer the tags 20 from the input table 12 to the main table 14. The transfer mechanism of FIG. 5 is preferably a pick and place mechanism that includes a carriage mechanism 41 which is mounted to an arm 42 by the cable track brackets 43. The movement of the carriage 41 along the arm 42 is powered by a power source 113. The arm 42 is mounted to the top surface 7 by a bracket 47. As the carriage 41 moves along the arm 42, it passes over a visual orientation camera 46. The visual orientation camera 46 is protected by a glass shield 101 held by a mount 103. A light source 105 illuminates the tag as it is transported over the visual orientation camera 46. The carriage then passes over a fail bin 48, sitting on a bin holder 107 which is mounted to the top surface 7 by the bin holder mount 109. A stop bracket 111, stops the carriage 41 at the proper point for delivering the tag 20 to the main table 14. In one embodiment of the invention, the bracket 111 may hit a push switch on the carriage 41 to stop its motion.

Figure 5B:
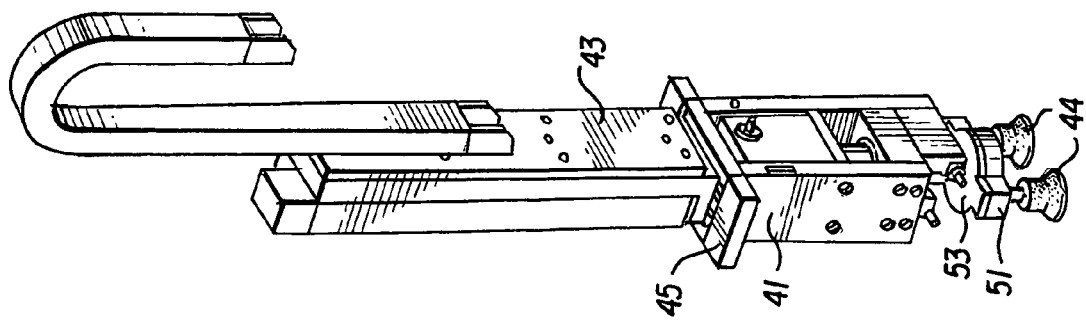
FIG. 5B is a detailed perspective view of the carriage mechanism shown in FIG. 5A.

A close up view of the carriage mechanism 41 is shown in FIG. 5B. The carriage 41 is mounted to the cable track bracket 43 by a mount 45. The carriage 41 has a pair of vacuum suction cups 44, that enable it to pick up a single tag to be transferred. The suction cups 44 are attached to a suction cup bracket 51 containing a sensor plate 53 which detects whether or not a tag 20 has been picked up.

Figure 1B:
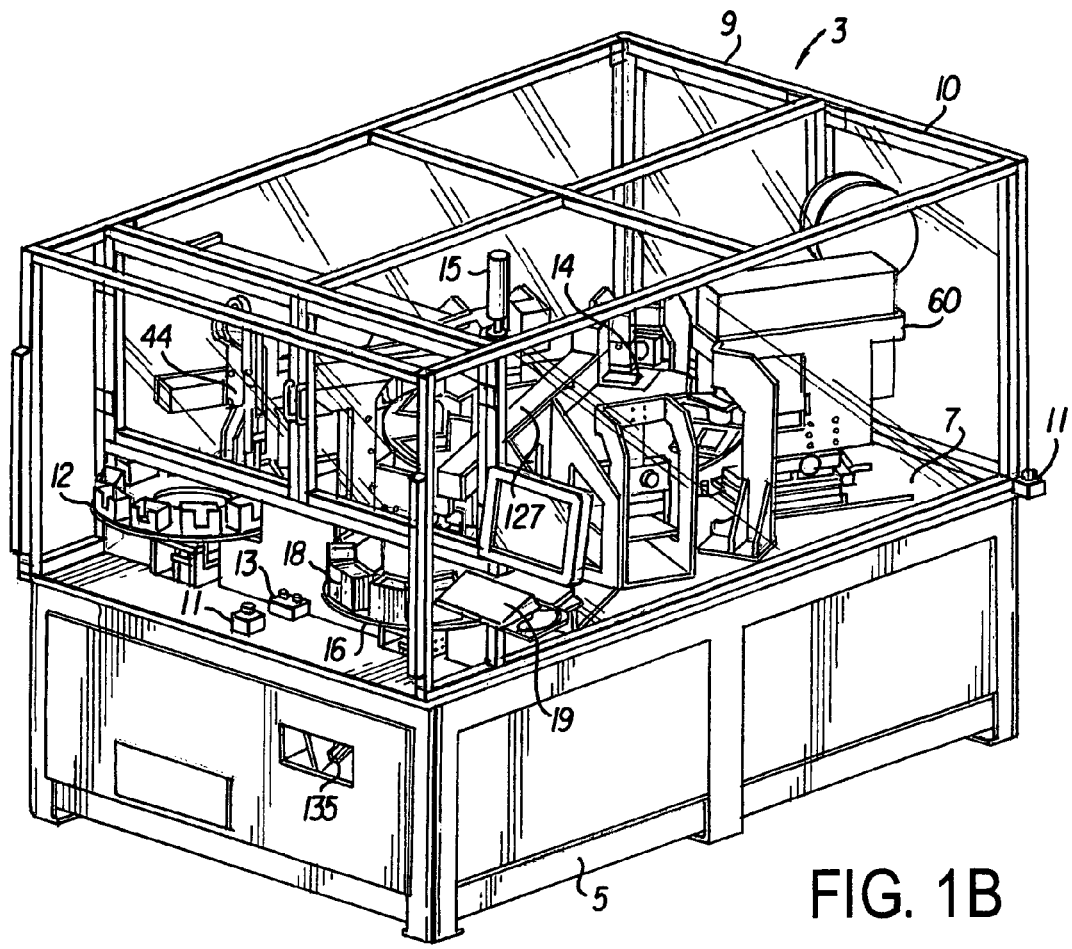
Figure 5C:
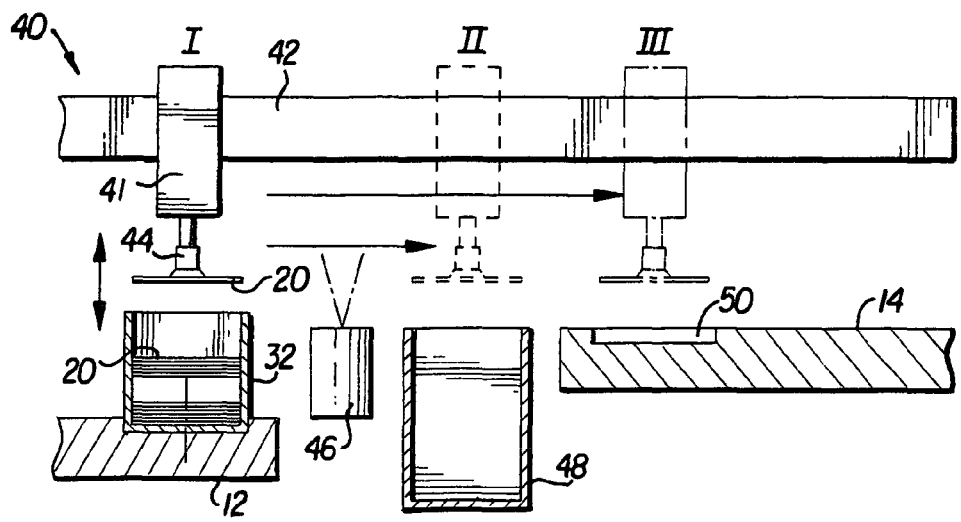
FIG. 5C is a schematic showing the operation of the pick place transfer mechanism of FIG. 5A.

FIG. 5C is a schematic diagramming how the tag is transferred. At the position marked I in FIG. 5C, the suction cup bracket 51 descends into the bin 32 until the suction cups 44 contact a tag 20. A vacuum is applied to the suction cups 44 to pick up one tag 20. The suction cup bracket 51 is then raised from the bin 32 and the carriage 41 moves along the arm 42 towards the main table 14 as shown in FIGS. 1 and 5. Preferably, the arm 42 is kept stationary and only the carriage 41 moves in order to deliver the tag 20. The motion of the carriage 41 is controlled by the automation controller 1038. The motion of the carriage is stopped if the bin 32 is sensed to be empty or if the security features of the system are activated.

As the tag is transported, its orientation 1018 is verified and, if necessary, corrected. Here, the carriage passes over a machine vision camera 46, as shown in position II of FIG. 5C. While the tag 20 is illuminated by the light source 105, the camera 46 determines its orientation by detecting the position of its chamfered corner 28. If the tag 20 is not correctly orientated, the sensor plate 53 rotates with respect to the carriage 41 until the tag 20 is in the proper position. If the tag 20 is upside down, or if its orientation cannot be determined, the tag 20 is dropped into the fail bin 48 and another tag is retrieved for processing. As shown in position III of FIG. 5C, once the tag is determined to be properly oriented, it is carried to the main table 14, where the suction cups lower it into a nest 50 at the first station of the main table 14. The tag 20 is released into the nest 50 by releasing the vacuum at the suction cups 44.

Figures 6A, 6B:
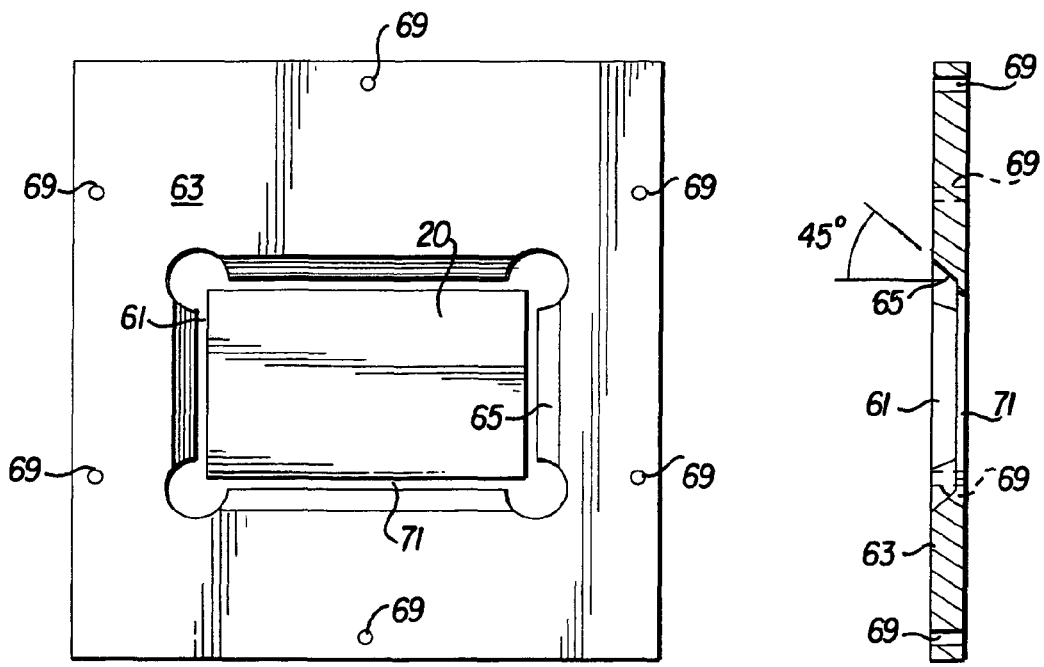
FIG. 6 is a detailed view of a nest of the main table.

FIGS. 6A and B are respectively a top view and a cross-section view of a nest 50 of the main table 14. A nest 50 consists primarily of a tag recess 61 surrounded by a frame 63. It is preferred that the frame be made of an acetal resin polymer such as Delrin® (DuPont Corp.), although other polymers are also contemplated. The frame 63 is held to the main table by a series of screws 69. The bottom surface 71 of the tag recess is preferably a glass plate to simulate the windshield on which the tag 20 will eventually be mounted. It is also contemplated that the bottom surface 71 may be made up of plexiglass or similar material. As shown, the tag 20, sits within the recess 61. Having the tag 20 within a recess 61 prevents its accidental movement and allows it to remain correctly aligned with the various workstations 52-66. It is also contemplated that various other shapes for the nest 50 and the recess 61 can be used, such as a recess 61 without rounded corners.

Figure 7:
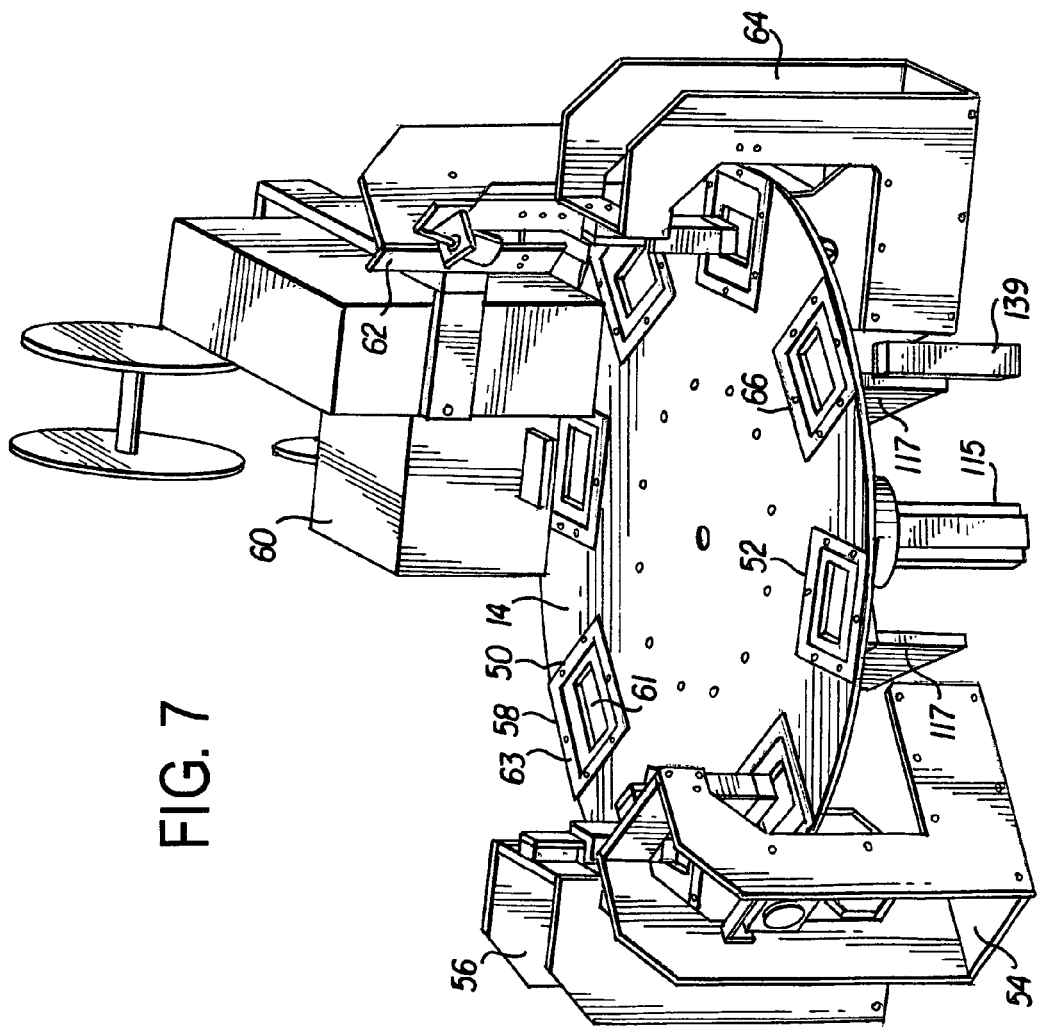
FIG. 7 is a detailed view of the main table used in the RFID tag processing system of FIG. 1.

As shown in FIG. 7, the main table 14 has eight stations, though it is contemplated that the main table may have more or fewer stations as proper testing requires. The eight stations include: Input station 52, RF Sensitivity test station 54, Phase-lock loop test station 56, Programming/locking station 58 (not shown in FIG. 6), Labeling station 60, Machine vision station 62, RF verification station 64, and an Output station 66. The main table 14 is preferably circular in shape and rotated by a drive 115 that is controlled by the automation controller 1038. The main table 14 is mounted to the top surface 7 through a series of brackets 117. The automated controller 1038 causes the drive 115 to turn the table so that a new tag 20 is moved to the next station for further processing.

Figure 8A:
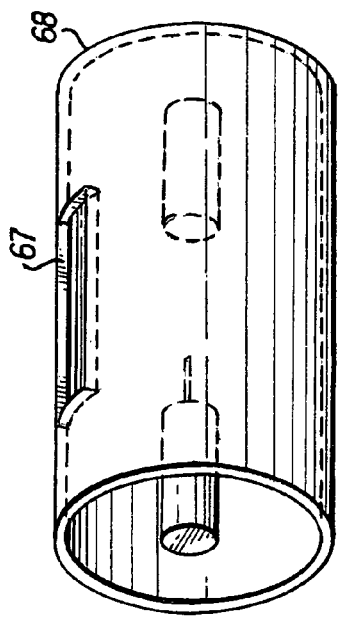
FIGS. 8A and B are diagrams of preferred resonant cavities for use with the present invention.
Figure 8B:
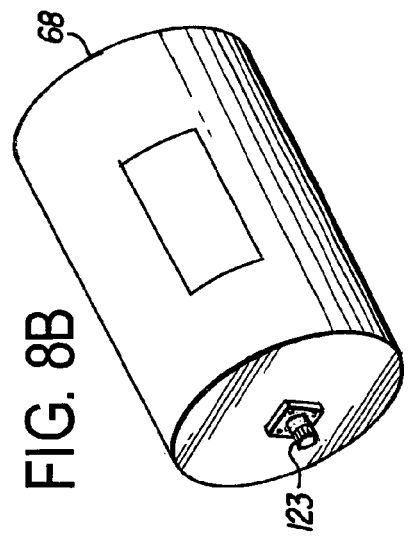

Stations 54, 56, 58 and 64 involve RF testing of the tags 20. Accordingly, those stations are provided with an aluminum RF resonant cavity 68, which is shown in FIGS. 8A and 8B. The resonant cavities 68 are small and eliminate the need for a large anechoic chambers, allowing for the compact size of the invention. The resonant cavities 68 do not require an RF shielded enclosure as they focus the RF energy only to the area around the opening. It is preferred that a cylindrical resonant cavity be used in the RF stations of the invention as the cylindrical shape allows for the emulation of a far-field measurement. It is also contemplated that resonant cavities of varying sizes may be used. The cavity is preferably manufactured by Electrodynamics (New Mexico).

The resonant cavity 68 at each station is tuned to a predetermined frequency. Preferably, the RF stations 54, 56, 58 and 64 are tuned so that testing will occur with at least three different frequencies during the processing of the tag 20. For example, the stations may be tuned so that station 54 is tuned to a first frequency, stations 56 and 58 are tuned to a second frequency and station 64 is tuned to a third frequency. The tag is tested at several different frequencies in its operating frequency range to assure that it will be operational throughout that range. A frequency range of 902 to 928 MHz is preferred, although other frequency ranges used with RFID tags are contemplated.

An exemplary diagram of an RF testing station is shown in FIG. 9. One tag is tested at a time at each RF test station by simulating a far field measurement corresponding to the resonant cavity technique. A solenoid 70 is attached to an extending arm 72 which is mounted to a support bracket 74. The resonant cavity 68 is mounted to the support bracket by a brace 119. As the table indexes, the tag 20 to be tested, located in a nest 50 on the table, moves underneath the solenoid 70. The extending arm descends the RF interrogator 70 into the nest 50, placing the RF testing station in the testing position. A foam pad at the bottom of the solenoid presses the tag 20 against the bottom surface 71 of the nest 50. The tag 20 is pressed against the bottom surface 71 as it will not function unless pressed against a surface, simulating its application to a windshield of a vehicle. An ionizer 121, may also be present to counteract any electrostatic discharge generated by the tag and the mechanical movements of the apparatus. After the necessary RF tests are performed, the station returns to the position shown in FIG. 9, allowing the main table 14 to index the tested tag 20 to a new station.

An RF signal is conductively transmitted into the resonant cavity 68 by a coaxial cable which attaches to port 123 as shown in FIG. 8. A magnetic field propagates horizontally around the cavity while an electric field propagates vertically thru the cavity. There are RF readers located underneath the main table 14 in the base of the system that send read/write commands for the testing and programming of the tag. The RF readers are controlled by the master controller 1012.

The various RF stations of the invention are calibrated against control tags. A set of pre-assembled tags to be used with the present invention may be measured in an anechoic chamber to simulate free-space performance. Tags with the desired performance characteristics are then chosen and designated as control tags. These test or "golden" tags are then used to calibrate all of the RF test stations in the automated tag tester 10.

The transfer mechanism 40 delivers the tag 20 from the input table 12 to the nest 50 of the first station, input station 52. After the tag is received by the main table 14 at the input station 52, the table then indexes, so that the tag 20 proceeds to the RF sensitivity test station 54. For the sensitivity test step 1020 of FIG. 3, the tag 20 is pressed against a glass plate or other substrate to simulate the environment in which the tag 20 will be used, i.e., a windshield. The stored tag ID is read and sent to the master controller 1012, where it is verified against the historical information stored in the production database 1008 using a high power read command. The tag 20 is read and written to using commands sent by the master controller 1012.

All tags are identified and tracked by the system through their ID. Any tags that are detected as having "no ID" or those with an ID that is a duplicate of another tag, will fail and will proceed through the remaining stations 56, 58, 60, 62 and 64 without further testing and is subsequently discarded. A step attenuation sensitivity test may also be performed.

The RF sensitivity test station 54 measures the ability to be able to read data in the tag and write data to the tag to configure tag operation. The manufactured tags have data written to them during manufacturing to allow for a data sensitivity measurement to be taken. The testing entails several steps of external power attenuation for measuring tag performance. A variable linear attenuator (VLA) may be used to excite the tag with a specific power level. The resolution of the station is preferably about 0.5 dB or better and most preferably is about 0.1 dB. If the tag passes the battery of tests at the sensitivity test station 54, it is pre-configured to customer specifications to prepare it for the final programming, step 1024 of FIG. 3, of tag specific information.

Once the RF sensitivity testing is complete, the tag 20 then moves to the phase-locked loop (PLL) testing station 56, step 1022 of FIG. 3. As the resonant cavity 68 for the PLL testing station 56 is tuned to a different frequency than the resonant cavity at the RF sensitivity station 54, another stepped attenuation sensitivity test may be performed. PLL testing 1022 may be performed by first reading the tag at 3 db above the ATA sensitivity, measuring the Interrupt Frequency and converting this reading to the Oscillator Frequency. The proper correction factor for this value will be calculated and the Oscillator Control Byte will be written to a pre-determined byte on the tag 20.

The PLL may then be read and tested to see if it passes or fails the necessary requirements. For example, the tag will be read at ATA wakeup and ATA wakeup +15 db. The calculated frequency difference between the two reads will be calculated and compared to a predetermined level to assign the tag a pass or fail rating. The tag might be assigned a pass rating if the difference between the ATA wakeup and the ATA wakeup +15 db frequencies is less than about 4-5 KHz. It is contemplated that the PLL may also be tested at other values, such as by comparing the frequency difference between readings at ATA wakeup +4 db and ATA wakeup +15 db. It is also contemplated that other PLL tests may be used at the PLL testing station, comparing other frequency differences.

The tag 20 then indexes to the programming and locking station 58, step 1024 of FIG. 3. As the resonant cavity 68 at this station is tuned to a different frequency than the previous resonant cavities, a stepped attenuation sensitivity test may be performed at this station without interference from the resonant cavities 68 at the other stations. All of the tag specific data to be stored in the ASIC is transferred to the tag 20 from the database 1008 via the master controller 1012 and verified at the programming station 58. An RF reader is used at this station to confirm that the data written to the tag matches that in the database 1008. The RF reader is then used to set data locks according to customer specifications. Once the data locks have been set, the tag data may only be unlocked using an specific RF key provided to the customer.

The tag 20 then indexes to the labeling station 60, step 1026 of FIG. 3. An applicator is used at this station to meet the requirements for quality, reliability, flexibility and durability of the tag labels. A preferred embodiment of the applicator mechanism 76 is shown in FIGS. 10A and 10B. The applicator mechanism 76 has an applicator arm 78, an applicator head 80 and a soft applicator pad 82. The main table 14 indexes so the tag 20 in the nest 50 is positioned directly below the applicator pad 82, as shown in FIG. 10A. There may also be an optional sensor (not visible) underneath the nest 50 at the labeling station 60 to determine whether there is a tag 20 in the nest 50 before labeling begins.

Figure 10C:
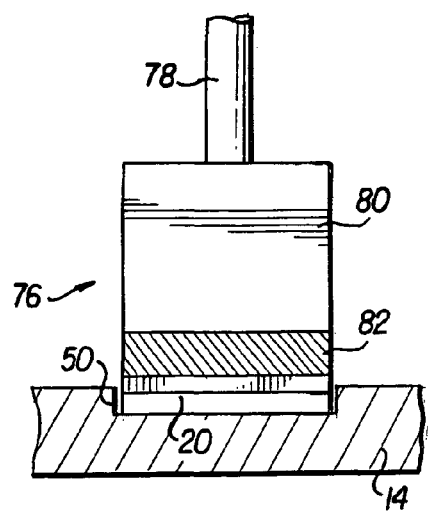

The printed label 84 is drawn out onto the applicator pad 82 with the adhesion side down using a vacuum mechanism, as shown in FIG. 10B. A vacuum sensor detects whether or not a label has been drawn out onto the pad. The applicator arm 78 then moves downward until the applicator pad 82 makes contact with the tag 20 in the nest 50 causing the label to be applied to the tag 20, as shown in FIG. 10C. The applicator 76 then returns to the starting position shown in FIG. 10A, allowing the table to index and the process to be repeated for the next tag 20.

Although it is contemplated that the labeling station 60 is an applicator 76 for applying pre-printed labels, a printer applicator (PA) can also be used that allows for the printing of information specific to the tag 20 to be labeled. The printer of the PA can print labels with a resolution of at least 300 dots per inch (dpi), or it can print labels with a higher or lower resolution, such as 100 dpi, 600 dpi, or 1200 dpi. Information specified by the customer can also be printed on the labels. A variety of label printing techniques may be used to print the labels, as long as the technique satisfies requirements for producing a clean, readable and durable label.

Tags that have failed testing are also labeled as appropriate to clearly distinguish them from good tags. If practical, failed tags will also be labeled with debugging information describing the failed test parameters to assist with troubleshooting and possible repair of the tag.

As the PA will require the most frequent maintenance of all of the stations, the PA is ideally designed so that label stock and the printing ribbon may be replaced and the print head may be cleaned in 15 minutes or less. As frequent maintenance is required, it is also ideal that the PA is situated in the enclosure 9 in a way that makes it easily accessible to the operator. As shown in FIG. 1, the labeling station 60 is located near doors in the enclosure 9 for easy access. In full production, the PA may need cleaning up to 3 or more times in a 24 hour period. To facilitate this, the PA may be mounted on a track or other mechanism that allows for it to easily be moved out of the enclosure 9 for better accessibility. The PA may also have a light tower to indicate its status.

If one label is printed every three seconds, the print head of the PA will preferably have a mean time between failures (MTBF) of greater than about 2000 hours of continuous operation. At the same rate the print engine will preferably have a MTBF of 5000 hours. If the PA requires prolonged repairs, a backup PA can be available at the production facility to use as a spare. It should take no longer than 30 minutes to remove the PA and replace it with a new one. Along with being located within the system for convenient operator access, the PA may also be mounted on special fixtures that allow it to be easily removed and installed from the system.

It is also contemplated that other PA may be used within the scope of the present invention, including those with different printing and or applicator systems. Any PA that can be modified to be used with the system of the invention and that is capable of printing labels as desired could be substituted for the PA described herein.

Once labeled, the tag 20 then moves to the machine vision testing station 62, step 1028, of FIG. 3. A diagram of the machine vision station 62 is shown in FIG. 11. The tag 20 is inspected by an automated machine vision camera 86 to verify label presence, correct label placement and to confirm the information printed on the label is correct and readable. The tag 20 may be illuminated by a light source 88 to make the printing on the label more visible. The machine vision device is linked to optical character recognition software which will compare the text and graphics printed on the tag with the customer's specifications. Any tags that are missing labels, or that have labels that are incorrectly placed or misprinted will be rejected.

The tag 20 then indexes to the RF verification station 64, step 1030 of FIG. 3. As the resonant cavity 68 at this station is tuned to a different frequency than all of the previous resonant cavities, a stepped attenuation sensitivity test may be performed. The stepped attenuation sensitivity tests performed at each RF station (i.e., stations 54, 56, 58 and 64) measure the RF performance of the tag 20 over the frequency range at which the tag 20 will operate. After this last stepped attenuation sensitivity test is performed, the RF performance of the tag 20 in everyday use will have been sufficiently verified. The testing performed at this station also verifies that the dynamic range of the tag 20 is within the specified parameters. The RF verification step 1030 is used as a final check to make sure that the tag data and tag ID match that in the database 1008.

For the tag 20 to be verified, the information on the tag 20 is read and compared with the information for that specific tag 20 stored in the database. If the tag data matches the database, the tag has passed all tests. If the tag data does not match the database, it is failed and will be discarded.

Figure 12:
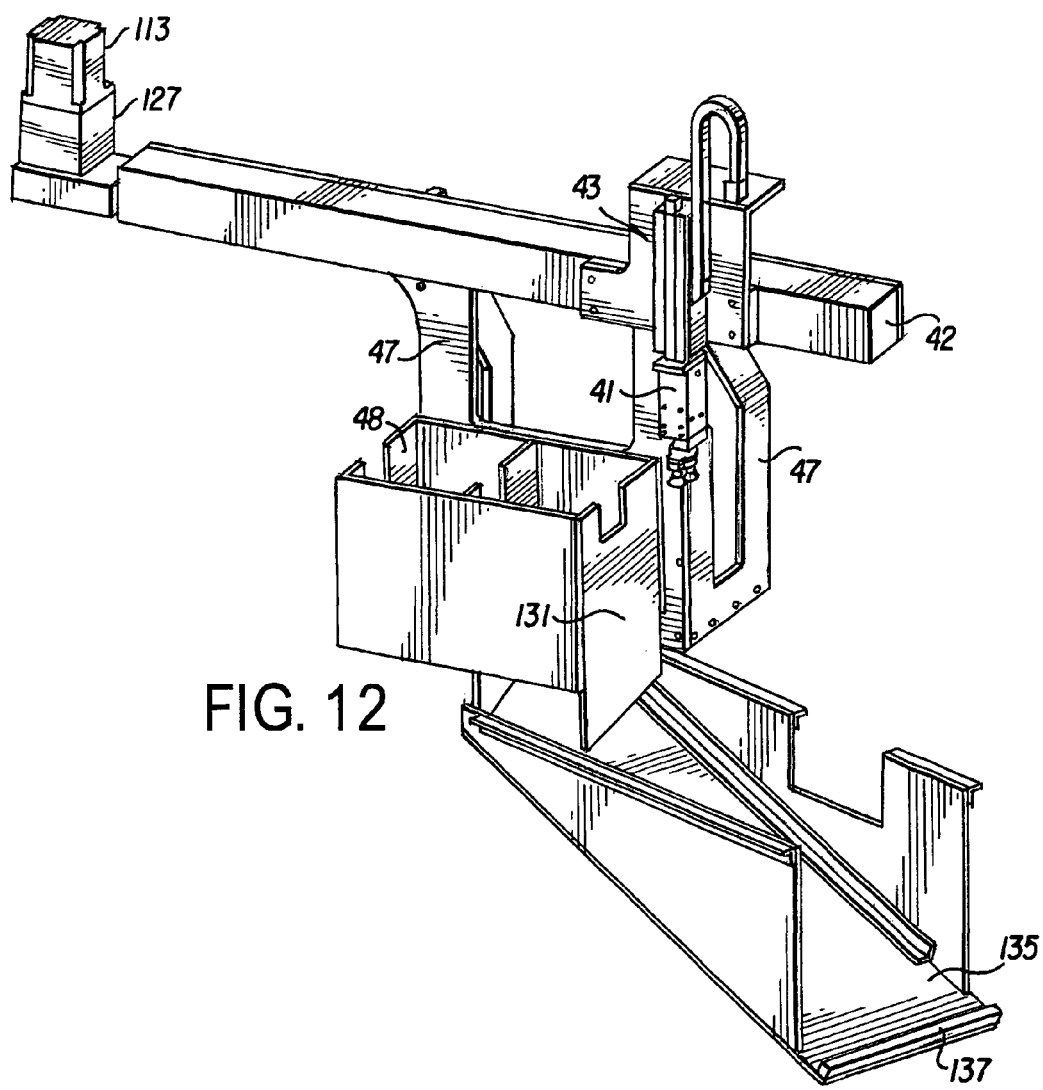
FIG. 12 is a detailed view of the output transfer mechanism used in the system of FIG. 1.

The tag 20 then indexes to the output station 66. From the output station 66, the tag is transferred to the output table 16 (FIG. 1). This transfer takes place through a transfer mechanism 127 which is shown in FIG. 12. The transfer mechanism 127 operates in the same manner as the transfer mechanism 41 diagrammed in FIG. 5A, and components with like functions are labeled with like numbers. Tags 20 are picked up the carriage 41 as described in FIG. 5C. The master controller 1012 identifies the tag at the output station 16 and the output transfer mechanism 43 whether the tag has passed or failed. If the tag has failed, it is transported and dropped in a fail bin 48 for later testing. If the tag has passed, it is transferred to the output table 16 for packaging. A sensor 139, located beneath the output station 66, detects whether a tag has actually been picked up.

A small number of tags that have passed all tests are collected for sample testing 1036. These tags are transferred from the output station to a sample collection bin 131. When the tag 20 is released into the bin 131, it will fall onto a slide 135 where it will come to rest on a stop 137 in an opening the base 5, as shown in FIG. 1. The sample tags will then be gathered and subjected to additional sample testing 1036. This type of testing is highly accurate but is too slow to take place in-line with the tag processing system. Further, the testing 1036 involves the use of large anechoic chambers.

Preferably, samples will be collected from about 0.5% of the tags to be produced in the run. However, it is also contemplated that from about 0.1% to about 30% of the tags produced in the run may be collected. A certain number of sample tags will be subjected to intensive testing and will not be shipped to the customer. As tests are performed, quality data collected on the sample tags is relayed to the database 1008, allowing for real time adjustment of the testing procedures.

Packaging, step 1032 of FIG. 3, of the tags takes place at the output table 16 as shown in FIG. 13. Barcoded shipping boxes 18 are placed in nests 90 in the top surface 92 of the output table as shown. The top surface 92 of the output table 16 is removable and is held in place with one or more thumbscrews 94. In this way, the nests on the output table 16 can be changed to accommodate differently sized boxes 18 for differently sized tags without the use of tools.

The shipping boxes 18 are placed in the nests 90 so that the barcodes 96 face the inside of the output table 16. A barcode reader on the output table 16 reads the barcode of the box 18 to be filled. The database records which specific tags 20 are packaged in which specific box 18. The database 1008 records the number of tags 20 being packaged into the box 18 until the appropriate number of tags 20 are packaged. After one box 18 is completed, the output table 16 indexes to the next box 18 to repeat the process. The filled boxes then index back to the operator to be sealed for shipping, step 1034 of FIG. 3.

The input table 12 and output table 16 are provided to enable the system to process a large number of tags without operator assistance. However, a single bin (i.e., without a rotatable table 12, 16) can be used to process fewer tags, or where that bin or box 18 is able to accommodate a large number of tags.

As outlined in FIG. 3, the entire system is controlled by the master controller 1012, which communicates with and commands the automation controller 1038. The automation controller 1038 controls the movements of the various components of the processing system, such as the indexing of the table, while returning status reports to the master controller 1012. The master controller 1012 then relays information from the database regarding the tags being processed at each station.

The master controller 1012 may be run by any type of appropriate software. Preferably, the master controller 1012 is run by software specifically designed for the system. Ideally, the software will be allow for easy operator interface and one that shows a clear indication of the tags being processed and their parameters as they compare to the database 1008.

Returning to FIG. 1, a bench 5 with a working top surface 7 and an enclosure 9 surrounding the system 10 may be used to contain the system 10 in a tag production apparatus 3. The RF testing stations 54, 56, 58, 62 are secured to the top surface 7 of the bench 5 by brackets 74, while the machine vision station 62 is secured to the top surface 7 by bracket 65. The brackets 74 are configured to extend over, and align with, the nest in the main table 14 so that the testing or labeling apparatus can directly interface with the tag. The transfer mechanisms 41 and 42 are secured to the top surface 7 by brackets 47 and 49, respectively. The labeling station 60 may be mounted directly to the top surface 7. The stations can be moved with respect to each other to be in a different order than that shown in the preferred embodiment. For instance, the programming station 58 can be located before the PLL station 56.

The enclosure 9 is preferably made of glass or plexiglass to protect the system 10 and prevent people from being able to access the machine while it is operating. If the doors of enclosure are opened, the apparatus will immediately stop running. As shown, one end of the enclosure 9 has a side panel which permits a portion of the input table 12 and output table 18 to extend to the outside the enclosure 9. Accordingly, an operator can quickly and easily remove empty bins from the input table 12 and replace them with loaded bins, without interfering with the operation of the system and minimizing entry of dust into the interior of the enclosure. Likewise, an operator can remove processed boxes from the output table 18 and replace them with empty boxes. Access panels are also positioned near the transfer devices to clear any jams, and to allow the failed tags from the reject bins.

The apparatus 3 is equipped with emergency stop buttons 11, which cause the system to pause when pressed. Control buttons 13, are used to re-home the machine to a neutral starting point if it is stopped for any reason. The apparatus 3 may also have sensors on any doors and light curtains which cause the system 10 to pause if someone attempts to reach inside the enclosure 9. The apparatus 3 may also have a light tower 15, which can give colored signals as to the status of the system 10. For example, the light tower 15 may signal green if the system is running and red if the system has stopped for any reason. Other colors may be used to signal specific messages. Preferably, the system 10 of the invention can process about 800 tags/hour.

It should be apparent that there are other embodiments of the invention that fall within the scope and spirit of the claims as set forth below. Non-limiting examples of such embodiments include systems with differently shaped tables, or systems with transfer mechanisms alternate to the pick and place mechanism described. In addition, although the system, apparatus and method of the preferred embodiment is used with label-based RFID tags, other products can also be processed such as hard case tags. In addition, the present invention is easily adaptable to produce tags of various shapes and sizes.

What is claimed is:

1. An automated system for processing radio frequency identification (RFID) tags, comprising:
    a first table having a first holder for receiving a plurality of tags, the tags being the RFID tags, said first holder including a bin holding the plurality of tags stacked in the bin with alternating tags stacked in an orientation staggered from stacked tags adjacent the alternating tags;
    a second table having a second holder for individually receiving the plurality of tags;
    a first transfer device individually transporting the plurality of tags from said first table to said second table;
    a plurality of RFID tag processing stations positioned about said second table for processing the tags, said second table sequentially positioning each of the individually received tags at each of the plurality of processing stations for processing;
    a third table having a third holder for receiving the tags processed at said second table; and
    a second transfer device individually transporting the plurality of tags from said second table to said third table.

2. The system of claim 1, wherein at least one processing station is a station for performing radio frequency testing of the tag.

3. The system of claim 2, wherein the station for performing radio frequency testing of the tag comprises, a resonant cavity; and a radio frequency interrogator aligned with the resonant cavity on either side of the tag.

4. The system of claim 1, wherein at least one processing station is a station for labeling of the tag.

5. The system of claim 4, wherein at least one processing station is a station for visual inspection of the labeled tag.

6. The system of claim 5, wherein the labeling station comprises a label printer.

7. The system of claim 1, wherein an individual tag is processed at one of the plurality of stations simultaneously with another individual tag at a different one of the plurality of stations.

8. The system of claim 1, wherein the number of processing stations is eight.

9. The system of claim 1, wherein the first table comprises a plurality of bins for holding multiple tags.

10. The system of claim 1, wherein said third holder comprises a shipping box.

11. The system of claim 10, further comprising a visual orientation camera detecting whether a tag is in a proper orientation for processing.

12. The system of claim 1, wherein the transfer mechanism comprises:
    an elongated arm extending between said first table and said second table;
    a carriage moving along the arm; and
    one or more retention devices attached to the carriage to individually engage the plurality of tags.

13. The system of claim 12, wherein said one or more retention devices comprise suction cups.

14. The system of claim 1, wherein said plurality of tags stacked in the bin are planar on one side of the tags.

15. The system of claim 1, three of the plurality of RFID tag processing stations being tuned to three different predetermined frequencies for testing the tags, with each of the three processing stations tuned to a predetermined frequency different than the other two of the three processing stations.

16. An automated system for processing radio frequency identification tags, comprising:
    a plurality of holders for receiving a plurality of tags, the tags being the RFID tags, a first one of said plurality of holders including a bin holding the tags stacked in the bin with alternating tags stacked in an orientation staggered from stacked tags adjacent the alternating tags;
    a main table having holders, each of the holders receiving one of the tags; and
    a plurality of processing stations positioned about said main table for processing the tags received in the holders, said main table sequentially positioning each of the tags at each of the plurality of processing stations for processing.

17. The system of claim 16, wherein at least one processing station is a station for performing radio frequency testing of the tag.

18. The system of claim 17, wherein the station for performing radio frequency testing of the tag comprises, a resonant cavity and a radio frequency interrogator aligned with the resonant cavity on either side of the tag.

19. The system of claim 16, wherein at least one processing station is a station for labeling of the tag.

20. The system of claim 19, wherein at least one processing is a station for visual inspection of the labeled tag.

21. The system of claim 19, wherein the labeling station comprises a label printer.

22. The system of claim 16, wherein an individual tag is processed at one of the plurality of stations simultaneously with another individual tag at a different one of the plurality of stations.

23. The system of claim 16, wherein the number of processing stations is eight.

* * * * *